United States Patent
Enfield

(10) Patent No.: US 8,491,952 B2
(45) Date of Patent: Jul. 23, 2013

(54) RED PEPPER SAUCE AND METHOD OF PREPARATION THEREOF

(76) Inventor: Ronald L. Enfield, Cherry Hill, NJ (US)

( * ) Notice: Subject to any disclaimer, the term of this patent is extended or adjusted under 35 U.S.C. 154(b) by 212 days.

(21) Appl. No.: 12/831,332

(22) Filed: Jul. 7, 2010

(65) Prior Publication Data

US 2011/0008501 A1 Jan. 13, 2011

Related U.S. Application Data

(60) Provisional application No. 61/223,478, filed on Jul. 7, 2009.

(51) Int. Cl.
*A23L 1/39* (2006.01)

(52) U.S. Cl.
USPC .......................................... 426/589; 42/638

(58) Field of Classification Search
USPC ................................. 426/589, 638
See application file for complete search history.

(56) References Cited

U.S. PATENT DOCUMENTS 3,615,597 A * 10/1971 Durst et al. ................... 426/650
4,126,710 A 11/1978 Jaworski et al.
5,356,647 A * 10/1994 Mason et al. ................. 426/243

FOREIGN PATENT DOCUMENTS

KR 2002016659 A1 * 3/2002

OTHER PUBLICATIONS

Betsy at cooking club from recipelink.com recipe posted on Sep. 18, 1997, Sloppy Joe recipe (pp. 3) and Taco seasoning recipe (pp. 7) total pp. 12.*
Igoe, Robert S.; Hui, Y. H. (2001). Dictionary of Food Ingredients (4th Edition). (pp. 87). Springer—Verlag.*
http://www.briess.com, History, Trademarks and malted and roasted grain flours, pp. 9, Aug. 31, 2007.*
http://www.amazon.com/Eden-Great-Northern-Barley-14-5Ounce/d p/B002KADFZU, May 21, 2010.
http://en.wikipedia.org/w/index.php?title=Hot_sauce &printable=yes, Oct. 5, 2010.

* cited by examiner

*Primary Examiner* — Jyoti Chawla
(74) *Attorney, Agent, or Firm* — Michael B. Fein; Eckert Seamans Cherin & Mellott

(57) ABSTRACT

A red chili sauce formulation which does not contain fried roux is prepared from other traditional ingredients and rather than fried roux, comprises malted barley flour.

5 Claims, No Drawings

RED PEPPER SAUCE AND METHOD OF PREPARATION THEREOF

CROSS-REFERENCE TO RELATED APPLICATIONS

This application claims benefit of provisional application Ser. No. 61/223,478, filed Jul. 7, 2009, which is hereby incorporated by reference.

BACKGROUND OF THE INVENTION

This invention relates to food formulations and more particularly to formulations for red chili sauce for use in seasoning foods. In the style of food known as "Tex-Mex" the red chili sauce is commonly known as "chili gravy." The traditional method for preparing this sauce involves first preparing a "roux," also called "fried flour roux" by mixing wheat flour with lard or cooking oil, salt and other seasonings, and frying the mixture until it achieves a uniform brown color. The exact temperature and time used, and the final degree of browning, are matters of personal preference and may vary significantly among persons preparing the sauce.

Currently no commercial chili gravy products are available to consumers, and individuals who want to prepare such a red pepper sauce must follow a process that includes the above-mentioned frying step. Consumers who desire a particular type of red pepper sauce known as "chili gravy" must prepare this sauce themselves from basic ingredients, using a labor-intensive method to obtain the proper flavor. Although some commercially available foods contain chili gravy, this sauce is not available separately for use in home cooking.

There are many recipes for red chili sauce, and dry mixes thereof which can be made into a sauce by adding water and broth. The broth is often beef or chicken broth but other liquids have been used. All of the previous recipes are based primarily on fried flour roux, which is comprised of oil or lard, white or wheat flour which includes gluten, salt, and spices and browning in a pan to a desired color, followed by adding red chili, water, and broth. Such prior traditional red chili formulas require a hand processing step, which makes it inconvenient to prepare such recipes. Furthermore, such traditional formulations can not be bottled as a liquid sauce which can be merely heated and used. Consumers who desire a particular type of red pepper sauce known as "chili gravy" must prepare this sauce themselves from basic ingredients, using a labor-intensive method to obtain the proper flavor. Although some commercially available foods contain chili gravy, this sauce is not available separately for use in home cooking. The present invention solves this problem with a combination of dry ingredients that simulates the flavor, color, and texture of wheat flour roux fried in oil, eliminating the most labor-intensive step in preparing chili gravy, and making possible the production of a dry mix with a much simpler preparation process.

It is an object of the present invention to eliminate the hand processing step required by traditional red chili formulas and recipes.

It is another object to provide a red chili sauce in liquid form which can be bottled. Another object is to provide a red chili sauce dry formula which can be stored for a period, packaged, and reconstituted by an end user at time of use.

It is another object of the invention to provide a process of preparing a red chili sauce without a frying step.

A further object is to provide a bottled formulation of red chili sauce.

An additional object is to mix the ingredients and add liquid such as water and/or broth, then bottling to store for future use.

SUMMARY OF THE INVENTION

These objects, and others which will become apparent from the following disclosure are achieved by the present invention which comprises in one aspect a formulation which excludes traditional fried flour roux and uses, instead, malted barley flour. It was unexpected that a red chili sauce dry mix could be made without roux, and also be stable on storage as a dry mix, yet when constituted with water and/or broth, becomes equal in taste and consistency to traditional red chili sauce. Furthermore the formulation of the invention can be combined with water and bottled, which is surprising in view of the fact that traditional red chili sauce can not be bottled.

Another aspect of the invention is a process comprising mixing a set of ingredients which excludes roux but rather includes malted barley flour, storing the dry mixture in a formulation which can be constituted later by a user by adding water and/or broth.

The present invention provides a combination of dry ingredients that simulates the flavor, color, and texture of wheat flour roux fried in oil, eliminating the most labor-intensive step in preparing chili gravy, and making possible the production of a dry mix with a much simpler preparation process.

The food formulation when dry comprises, by weight, about 2-15% malted barley flour, about 20-60% paprika and/or chili pepper, about 10-30% sweetener, about 10-25% cornstarch, about 1-8% salt, up to about 1% of one or more spices selected from the group consisting of cinnamon, nutmeg, citric acid, cumin, and oregano, and optionally up to about 5% garlic, the formulation excluding roux. This food formulation can be packaged and sold for later use by a consumer with directions to add liquid. In preferred embodiments the liquid is added in proportions of 5-12 ounces to 50 grams of dry formulation, more preferably about 8 ounces/50 grams.

Alternatively the food formulation can be sold as a sauce, bottled or canned, or otherwise packaged, wherein the mix is formulated with liquid in the same proportions, i.e., 5-12 ounces/50 grams, with the further addition of preservatives, for example guar gum or xanthan gum.

DETAILED DESCRIPTION OF THE INVENTION

While the invention is capable of many embodiments, for illustration purposes only the following examples of formulations of red chili sauce are set forth in detail.

Consumers who desire a particular type of red pepper sauce known as "chili gravy" must prepare this sauce themselves from basic ingredients, using a labor-intensive method to obtain the proper flavor. Although some commercially available foods contain chili gravy, this sauce is not available separately for use in home cooking. The present invention solves this problem with a combination of dry ingredients that simulates the flavor, color, and texture of wheat flour roux fried in oil, eliminating the most labor-intensive step in preparing chili gravy, and making possible the production of a dry mix with a much simpler preparation process.

The food formulation of the invention can be in dry mix form or in constituted sauce form. In its dry form it comprises, by weight, about 2-15% malted barley flour, about 20-60% paprika and/or chili pepper, about 10-30% sweetener, about 10-25% cornstarch, about 1-8% salt, up to about 1% of one or more spices selected from the group consisting of cinnamon, nutmeg, citric acid, cumin, and oregano, and optionally up to about 5% garlic, the formulation excluding roux. This food formulation can be packaged and sold for later use by a consumer with directions to add liquid. In preferred embodiments the liquid is added in proportions of 5-12 ounces to 50 grams of dry formulation, more preferably about 8 ounces/50 grams.

The liquid can be water, broth, or combinations of water and broth. The broth can be beef or chicken broth, or can be beer, as examples.

Paprika is a spice made from the grinding of dried fruits of Capsicum annuum. Paprika can range from mild to hot. For this invention, paprika refers to mild forms whereas chili pepper refers to hot forms of Capsicum. There are various forms and varieties of chili pepper, for example cayenne pepper, jalapeno pepper, habanero pepper, New Mexico red chili pepper, and Anaheim red chili pepper. It is preferred to have both paprika and red chili pepper, and preferably in a ratio of 8 paprika to 1 red chili pepper by weight.

The sweetener can be sugar, which is preferred, or it can be honey, artificial sweetener, or any combination thereof.

The malted barley flour is preferably roasted and is available from a variety of sources, one of which is breweries.

In a first embodiment, the formulation consists of the following components:

Readily available dried, ground food ingredients and spices, combined in predetermined weight quantities of 39.62% Paprika, 21.67% Sugar, 16.83% Cornstarch, 10.79% Malted barley flour, 3.95% Salt, 4.40% Red pepper, 2.44% Garlic, 0.09% Cinnamon, 0.08% Nutmeg, 0.06% Citric Acid, 0.04% Cumin, 0.03% Oregano, mixed in a tumble mixer/blender or double ribbon blender (also sometimes called a dry homogenizer) or the equivalent until completely uniform, to create a unique dry mix. The formulation does not include roux and is not fried, as is traditional ingredients red chili gravy.

The malted barley flour adds color and flavor to replace the color and flavor of wheat flour roux. The cornstarch thickens the cooked sauce in place of the wheat flour in the roux. In addition, this formulation has the capability to withstand high-temperature processing without losing its thickening properties, an essential element for producing the finished sauce in bottled form. Wheat flour tends to break down under those conditions and the resulting sauce would be watery and unpalatable. Finally, the citric acid balances aspects of the flavor of the red peppers and spices, and it also lowers the pH factor of the cooked sauce to enable safe low-temperature canning.

To prepare the cooked sauce, the dry mix is combined with water (or alternative liquid such as broth) in proportion of 8 ounces to each 50 grams of the prepared mix, stirred until well mixed, then brought to a boil. Upon reaching a boil, heat is reduced and the sauce is simmered for 5 minutes, and then removed from heat. At this point the sauce may be canned, used in cooking, or used in consumption of other prepared foods.

It is important that all the aforementioned ingredients are present in the dry mix and are present in the specified proportions at the time the mix is combined with water (or other fluid) to make the liquid sauce. Although this formulation is preferred, it is possible to change the proportions or amounts of any ingredient with respect to other ingredients, depending on desired flavor, color, and/or texture of the final sauce.

The present invention replaces the roux (produced by frying in oil) of traditional red chili gravy production with roasted malted barley flour and cornstarch (modified food starch from waxy maize) to obtain color, flavor, and texture properties similar to those provided by the roux.

The ingredients can be combined in a tumble mixer/blender or double ribbon blender (also sometimes called a dry homogenizer) or the equivalent.

Examples of forms of the food formulation of the invention include, by way of example, dry powder mix for preparing red chili gravy; bottled red chili gravy sauce, dry seasoning mix for application to cooking or prepared foods, dry seasoning mix for use as barbecue rub, and dry seasoning mix for use in manufacturing seasoned potato chips, crackers, or other seasoned snack foods The current invention eliminates the need for the roux frying step, resulting in a shelf-stable dry powder that can be prepared by mixing with water and heating for a specified time period. This makes the sauce available to consumers with much less time and effort than the traditional sauce prepared with the existing process. When used in restaurants, it can be prepared with significantly less labor cost than a traditional red chili sauce, yet provide a more interesting and appealing flavor due to the unique formulation of ingredients.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A dry red chili sauce formulation consisting of, on a dry weight basis, about 2-15% malted barley flour, about 20-60% paprika and/or chili pepper, about 10-30% sweetener, about 10-25% cornstarch, about 1-8% salt, up to about 1% of one or more spices selected from the group consisting of cinnamon, nutmeg, citric acid, cumin, and oregano, and optionally up to about 5% garlic, the formulation being dry and excluding roux, and which, upon hydration, does not require roux.

2. A method of preparing a red chili sauce comprising mixing a dry blend consisting of about 2-15% by weight malted barley flour, about 20-60% by weight paprika and/or chili pepper, about 10-30% by weight sweetener, about 10-25% by weight cornstarch, about 1-8% by weight salt, up to about 1% of one or more spices selected from the group consisting of cinnamon, nutmeg, citric acid, cumin, and oregano, and optionally up to about 5% garlic in a blender or mechanical mixer, the red chili sauce dry blend excluding roux.

3. The method of claim 2 wherein the ingredients which are mixed consist of about 39.62% paprika, about 21.67% sugar, about 16.83% cornstarch, about 10.79% malted barley flour, about 3.95% salt, about 4.40% red pepper, about 2.44% garlic, about 0.09% cinnamon, about 0.08% nutmeg, about 0.06% citric acid, about 0.04% cumin, and about 0.03% oregano.

4. The method of claim 2 further including mixing or dissolving the dry formulation in water in a ratio of 5-12 ounces of water to 50 grams dry formulation to form a red chili sauce which excludes roux.

5. A red chili sauce prepared according to the method of claim 4.

* * * * *